US000001507H

United States Statutory Invention Registration [19]

[11] Reg. Number: H1507

[45] Published: Dec. 5, 1995

Hendrickson et al.

[54] DEMAND ASSIGNED MULTIPLE ACCESS (DAMA) DEVICE CONTROLLER INTERFACE

[75] Inventors: Clark R. Hendrickson, La Mesa; Thomas G. Mattoon, San Diego, both of Calif.

[73] Assignee: The United States of America as represented by the Secretary of the Navy, Washington, D.C.

[21] Appl. No.: 54,923

[22] Filed: Apr. 23, 1993

[51] Int. Cl.[6] ..... G06F 13/00

[52] U.S. Cl. ..... 395/250; 395/891; 395/821; 395/872; 370/16

[58] Field of Search ..... 395/200, 250, 395/725, 800

[56] References Cited

U.S. PATENT DOCUMENTS

| | | | |
|---|---|---|---|
| 4,047,159 | 9/1977 | Boudry . | |
| 4,047,246 | 9/1977 | Kerllenevich | 395/250 |
| 4,075,691 | 2/1978 | Davis | 395/250 |
| 4,447,873 | 5/1984 | Price et al. . | |
| 4,907,186 | 3/1990 | Racey | 395/250 |
| 4,939,735 | 7/1990 | Fredericks et al. . | |
| 5,014,236 | 5/1991 | Pogorzelski et al. . | |
| 5,113,368 | 5/1992 | Le Calvez et al. . | |
| 5,123,091 | 6/1992 | Newman . | |
| 5,134,702 | 7/1992 | Charych et al. . | |
| 5,167,020 | 11/1992 | Kahn | 395/250 |
| 5,175,819 | 12/1992 | Ngoc | 395/250 |
| 5,287,458 | 2/1994 | Michael | 395/250 |

OTHER PUBLICATIONS

"System (Semiautomatic), UHF Demand Assigned Multiple Access (DAMA)", contract specification, 15 Sep. 1980, Naval Electronic Systems Command.

"UHF Demand Assigned Multiple Access (DAMA) System; C–10765 ()/U Program Design Specification Controller—Indicator", FSCS–212–14, Revision A, 1 Sep. 1987, Space and Naval Warfare Systems Command.

"UHF Demand Assigned Multiple Access (DAMA) System; TD–1271B/U Multiplexer Program Performance Specification", FSCS–212–16, Revision D, 1 Sep. 1987.

*Primary Examiner*—Bernarr E. Gregory

*Attorney, Agent, or Firm*—H. Fendelman; T. G. Keough; P. A. Lipovsky

[57] ABSTRACT

A controller interface for demand assigned multiple access (DAMA) devices is provided. The controller interface includes a plurality of matched pairs of receive/transmit FIFO memory devices. The receive FIFOs, controlled by a clock signal output by the DAMA devices, accept serial format data and output parallel format data onto a first parallel data bus internal to the controller interface. The transmit FIFOs, controlled by an independent clock that generates clock pulses at a rate that is approximately equivalent to that of the clock signal used to control each of the receive FIFOs, accept parallel format data from a second parallel data bus internal to the controller interface and output serial format data for ultimate use by the DAMA devices. A first buffer receives parallel format data on the first internal parallel data bus and outputs same onto a parallel control data bus external to the controller interface. A second buffer receives parallel format data on the external parallel control data bus and outputs same onto the second internal parallel data bus. A third buffer stores status information from each of the receive and transmit FIFOs. An enable signal is issued based on the status information to a selected one of the receive and transmit FIFOs so that the selected receive FIFO outputs parallel data onto the first internal parallel data bus and the selected transmit FIFO outputs serial format data.

8 Claims, 12 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

DEMAND ASSIGNED MULTIPLE ACCESS (DAMA) DEVICE CONTROLLER INTERFACE

STATEMENT OF GOVERNMENT INTEREST

The invention described herein may be manufactured and used by or for the Government of the United States for governmental purposes without the payment of any royalties thereon or therefor.

FIELD OF THE INVENTION

The present invention relates to the field of controllers and more particularly to the control of demand assigned multiple access (DAMA) device communication channel utilization.

BACKGROUND OF THE INVENTION

Demand assigned multiple access (DAMA) devices are installed on shore and on board U.S. Navy ships to improve utilization of UHF satellite communication channels. A DAMA device is a communications multiplexer that allocates time slots to specified UHF channel's circuits to improve communication data throughput. One DAMA device that has been used extensively is the TD-1271B/U ("1271") DAMA device manufactured by Motorola Corporation. The 1271 DAMA device sends and receives 32 byte blocks of data at 480 kilo bits per second (kbs) with no handshaking. Every 1.386 seconds two 32 byte blocks are sent and one 32 byte block is received.

Although the 1271 DAMA device has automatic control capabilities (i.e., a high-speed serial communication port), the current mode of operating the 1271 DAMA device is the distributed control (DC) mode. In the DC mode, access to the time slots are made locally at each 1271. No central controller is required other than to provide timing. The disadvantage of this mode is that there is no central point of control, there is no communications privacy, and there are constant key problems.

Thus, there is a need for a computer controller for communicating with a plurality of DAMA devices (e.g., 1271 DAMA devices) via their provided automatic control port in order to improve operating efficiency of the communication system serviced by the devices. Accordingly, it is an object of the present invention to provide an interface for a computer to communicate with one or more DAMA devices via the DAMA devices' provided automatic control port. Another object of the present invention is to provide a DAMA controller interface that is adapted to the data transfer characteristics of the DAMA devices' automatic control port. A further object of the present invention is to provide a DAMA controller interface that may be built from readily available circuit components. Still another object of the present invention is to provide a computer controller interface for a plurality of DAMA devices such that the computer used is a PC/AT type computer.

SUMMARY OF THE INVENTION

In accordance with the present invention, a controller interface for a demand assigned multiple access (DAMA) device is provided. The controller interface includes a matched pair of first-in, first-out (FIFO) memory devices, one being a receive FIFO memory device and the other being and a transmit FIFO memory device. The receive FIFO is controlled by a clock signal output by the DAMA device. Serial format data is input into the receive FIFO which outputs parallel format data onto a first internal parallel data bus internal to the controller interface. Parallel format data from a second parallel data bus internal to the controller interface is input into the transmit FIFO which outputs serial format data. A first buffer receives parallel format data from the first internal parallel data bus and outputs same onto an external parallel control data bus external to the controller interface. A second buffer receives parallel format data from the external parallel control data bus and outputs same onto the second internal parallel data bus. A third buffer stores status information from the receive FIFO indicative of the presence or absence of data, and stores status information from the transmit FIFO indicative of the transmit FIFO's readiness to accept data. A FIFO command and control issues an enable signal based on the status information to enable the receive and transmit FIFOs. The receive FIFO outputs parallel data onto the first internal parallel data bus when enabled, and the transmit FIFO outputs serial format data when enabled to ultimately go to the DAMA device. A clock, generating clock pulses at a rate that is approximately equivalent to that of the clock signal used to control the receive FIFO, is provided to clock data through the transmit FIFO.

DESCRIPTION OF THE DRAWINGS

FIGS. 2A–7 are the detailed schematic and logic diagrams of a preferred embodiment DAMA controller interface for controlling four 1271 DAMA devices with a PC/AT type computer.

FIGS. 2A and 2B are the diagram of the signals passing between the controller interface and the AT bus of the computer, and the matched clock used to shift data out of the transmit first-in, first-out (FIFO) memory devices;

FIG. 7 is the diagram of the gating used for the clock signal that serially loads the receive FIFO memory devices.

DESCRIPTION OF THE PREFERRED EMBODIMENT

Figure 1:
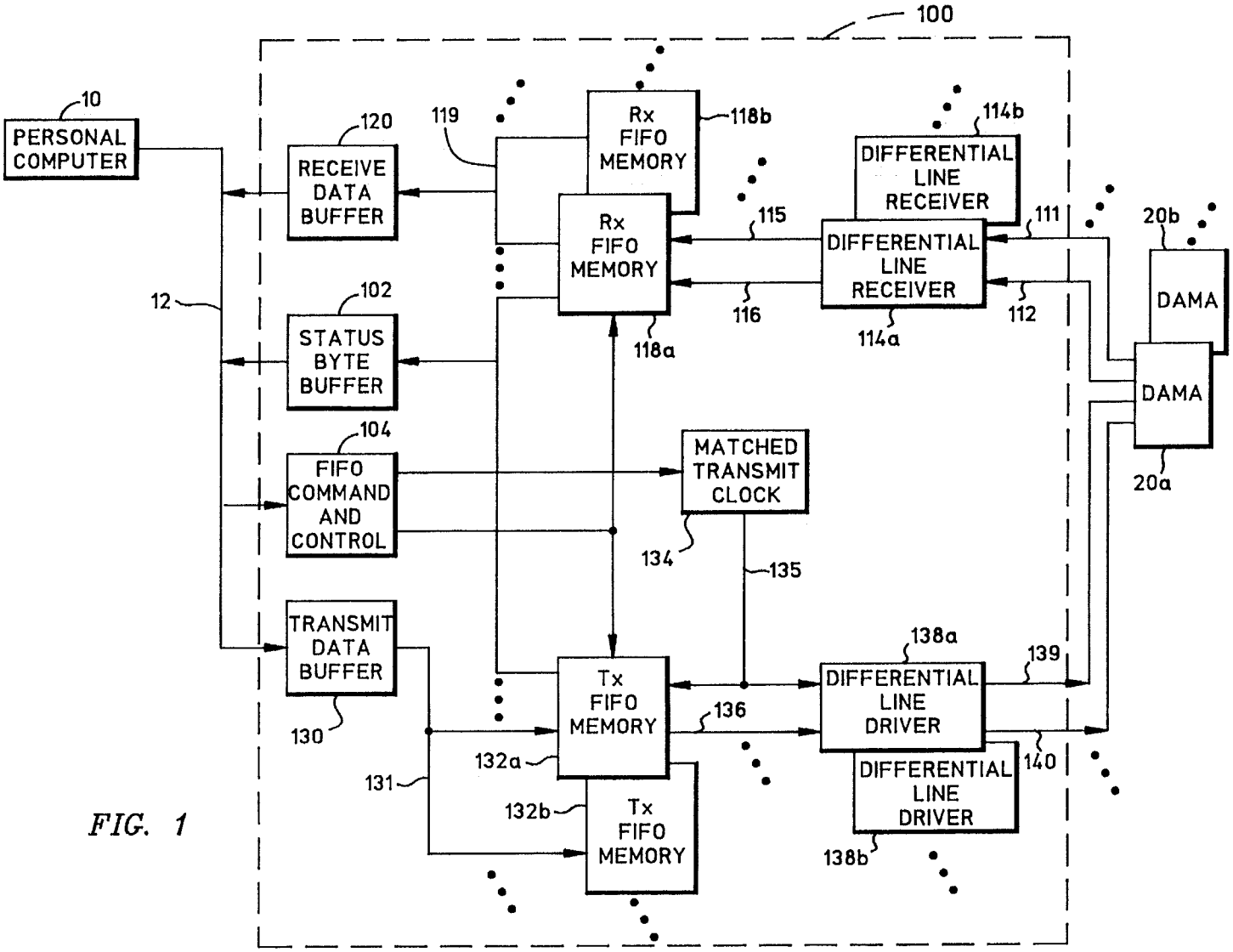
FIG. 1 is a functional block diagram of the DAMA controller interface according to the present invention.

Referring now to the drawings, and in particular to FIG. 1, a demand assigned multiple access (DAMA) device controller interface is shown as a functional block diagram lying within dotted line box 100. A microprocessor based personal computer 10 communicates with a plurality of DAMA devices 20*a*, 20*b*, . . . through controller interface 100. By way of example, DAMA devices 20*a*, 20*b*, . . . may be a TD-1271B/U (referred to hereinafter as "1271") DAMA device receiving/transmitting data in 32 byte serial bursts. For purposes of clarity, an ellipsis (. . .) has been used in FIG. 1 to indicate devices and data lines that must be repeated for each DAMA 20*a*, 20*b*, . . . Therefore, for purposes of description, only devices and data lines as they relate to DAMA 20*a* will be described. Devices and lines commonly used by all DAMA devices 20*a*, 20*b*, . . . are shown without the ellipsis (namely, status byte buffer 102, FIFO command and control 104, receive data buffer 120, transmit data buffer 130, and data buses 119 and 131).

Personal computer 10 is connected to controller interface 100 via the computer's parallel input/output (I/O) control data bus 12. Communicating with personal computer 10 by way of I/O control data bus 12 are receive data buffer or first buffer 120, transmit data buffer or second buffer 130, status byte buffer or third buffer 102, and FIFO command and control 104. Note that by way of convention receive and transmit are used as they relate to data received by and transmitted from personal computer 10.

On the receive side of controller interface 100, each DAMA transmits its data bursts serially on data line 111 and its associated clock signal (e.g., 480 kbs for the 1271 DAMA) on clock line 112. Since the 1271 DAMA device outputs a balanced voltage (±6 volts) digital format, and since it is desired to build controller interface 100 from standard transistor-transistor-logic (TTL) level components, differential line receiver 114*a* is provided to convert serial signals on lines 111 and 112 to serial signals at the TTL level and output same on data line 115 and clock line 116, respectively. TTL level data on data line 115 is clocked into a respective receive (Rx) FIFO memory device 118*a*. When DAMAs 20*a*, 20*b*, . . . are 1271 DAMA devices, receive FIFO memories 118*a*, 118*b*, . . . are typically 32 byte FIFO memory devices. Data from receive FIFO memory 118*a* is output in parallel format onto a first parallel data bus 119 which in turn feeds receive data buffer 120. The same process holds true for each additional DAMA 20*b*, . . . , differential line receiver 114*b*, . . . , and receive FIFO memory 118*b*, . . . combination. Receive data buffer or first buffer 120 temporarily stores parallel format data from bus 119 before it is passed to computer 10 on I/O control data bus 12.

On the transmit side of controller interface 100, parallel format data is passed from computer 10 on I/O control data bus 12 to transmit data buffer or second buffer 130. From transmit data buffer 130, the parallel format data is passed on a second parallel data bus 131 to transmit (Tx) FIFO memory 132*a*. Similar to the receive side, transmit FIFO memory 132*a* is typically a 32 byte FIFO memory when controller interface 100 is configured to operate with 1271 DAMA devices. Data leaving transmit FIFO memory 132*a* must leave as serial format data whose timing is commensurate with that of the respective DAMA device 20*a* used. Accordingly, matched transmit clock 134 issues a clock signal on line 135 that is independent of computer 10 to clock data out of transmit FIFO memory 132*a* at a rate that is approximately equal to that of the respective DAMA devices used (e.g., 480 kbs when configured to operate with 1271 DAMA devices).

Similar to the receive side of controller interface 100, data stored in transmit FIFO memory 132*a* is at the standard TTL level. Accordingly, when the data is serially clocked out of transmit FIFO memory 132*a*, the serial data must be converted to the balanced voltage digital format of the respective DAMA device 20*a* used. To accomplish this, differential line driver 138*a* converts the clock signals on line 135 and serial data on data line 136 to the appropriate balanced voltage digital level on clock line 139 and data line 140, respectively (e.g., ±6 volts for the 1271 DAMA). The above described process holds true for data transferring from second data bus 131 through each additional transmit FIFO memory 132*b*, . . . , differential line driver 138*b*, . . . , and DAMA device 20*b*, . . . combination.

In operation, the receive cycle for DAMA 20*a* (or any other DAMA) begins when balanced voltage data and clock signals are transmitted over lines 111 and 112, respectively. Differential line receiver 114*a* converts the data and clock signals to TTL level signals. The data is loaded into receive FIFO memory 118*a* using the clock signal over line 116. Once the first byte of data is stored in receive FIFO memory 118*a*, an output ready signal is issued to FIFO command and control 104 which in turn generates an interrupt that is sent to computer 10. Upon being interrupted, computer 10 checks status byte buffer 102 to determine which receive FIFO memory has data present on its output. Computer 10 then issues a parallel dump command via FIFO command and control 104 to the appropriate receive FIFO memory. The parallel dump command "enables" outputs from the appropriate receive FIFO memory (i.e., changes the outputs from a high impedance state to a low impedance state). Parallel data is then output from the enabled receive FIFO memory to receive data buffer 120 via first parallel data bus 119. Computer 10 reads data from receive data buffer 120 over I/O control data bus 12. Status byte buffer 102 is then polled by computer 10 to determine if more bytes are present on the enabled receive FIFO memory that is currently passing data. This process is repeated until 32 bytes have been passed from the enabled receive FIFO memory to computer 10. At this point, the remaining receive FIFO memories are polled to determine if any other receive FIFO memory has bytes to send to computer 10. After passing all 32 byte blocks of data from each receive FIFO which had data, any extraneous bytes present on the receive FIFOs' outputs are flushed out by repeating the parallel dump command via command and control 104.

The transmit cycle begins when computer 10 checks status byte buffer 102 and detects a readiness to accept data from a selected one of the transmit FIFO memories. Parallel data is then passed on I/O control data bus 12 and is loaded into transmit data buffer 130. A parallel load command is issued through FIFO command and control 104 to, for example, transmit FIFO memory 132*a* to load data therein. Data will continue to be loaded into transmit FIFO memory 132*a* until transmit FIFO memory 132*a* is full at which time the parallel load command is passed to another selected transmit FIFO memory 132*b* having a rediness to select data, . . . (Note that data could also be simultaneously loaded or shared between several of the transmit FIFO memories if the same data were to be transmitted to multiple DAMA devices.) A control command is issued by FIFO command and control 104 to matched transmit clock 134 to initiate the sending of clock signal 135 to the appropriate transmit FIFO memory (or memories) and associated differential line driver(s) that are enabled. The serial outputs of the enabled transmit FIFO memory are changed from a high impedance state so that the enabled transmit FIFO memory will output data serially upon receiving clock signal 135. The differential line driver (or drivers) receiving data on line 136 and clock signal 135 converts the data and clock signal back to the balanced voltage signal level utilized by the DAMA device(s), receiving same on lines 139 and 140, respectively.

By way of example, detailed schematic and logic diagrams of controller interface 100 are shown in FIGS. 2–7 as constructed to interface between an AT type personal computer and what could be considered four "local" 1271 DAMA devices (i.e., hard wired to controller interface 100). It should be noted that control of these local DAMA devices could in turn be used to control remote DAMA devices (e.g., on board ship) through an appropriate satellite or other relay.

Figure 2A:
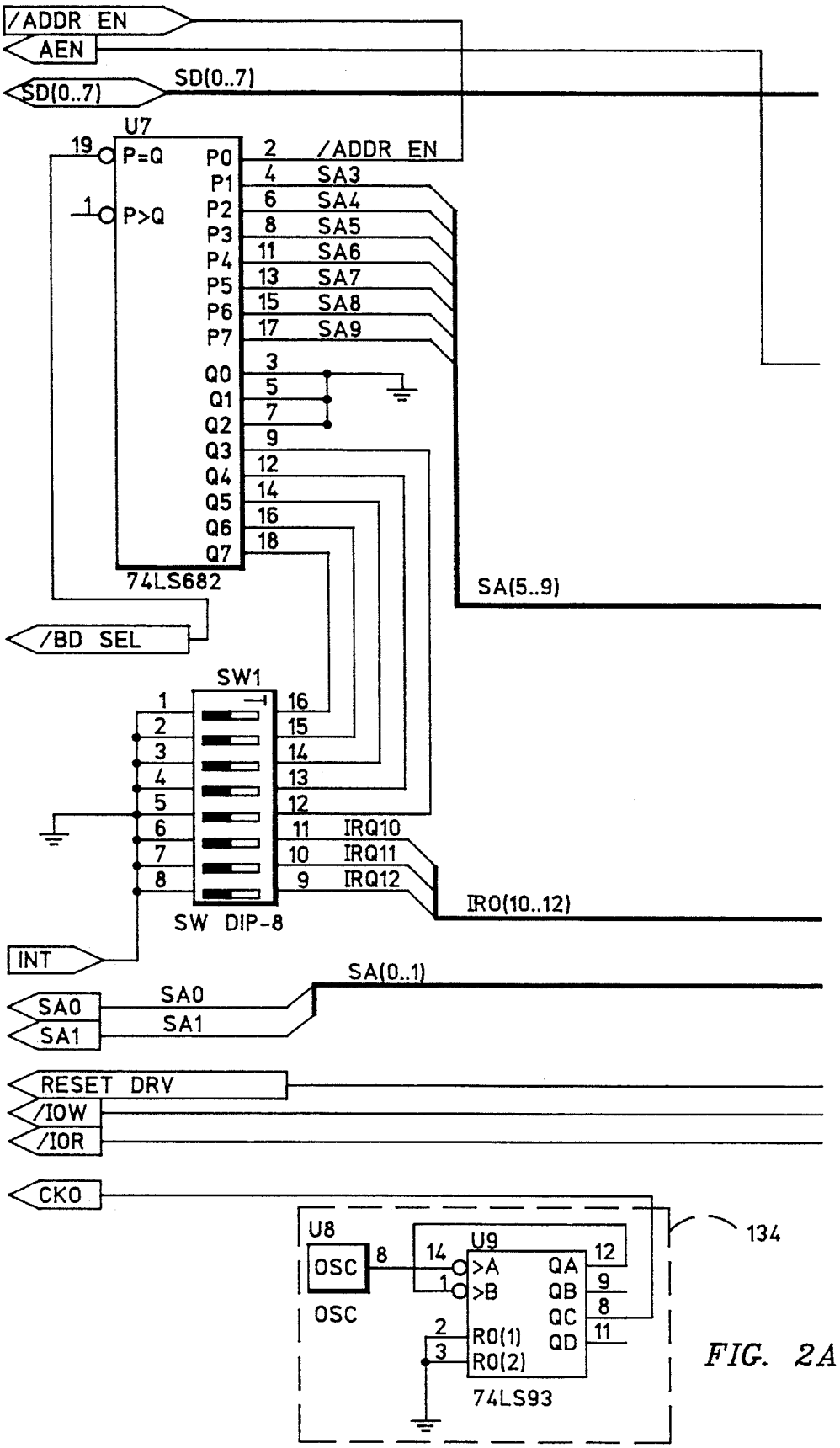
Figure 2B:
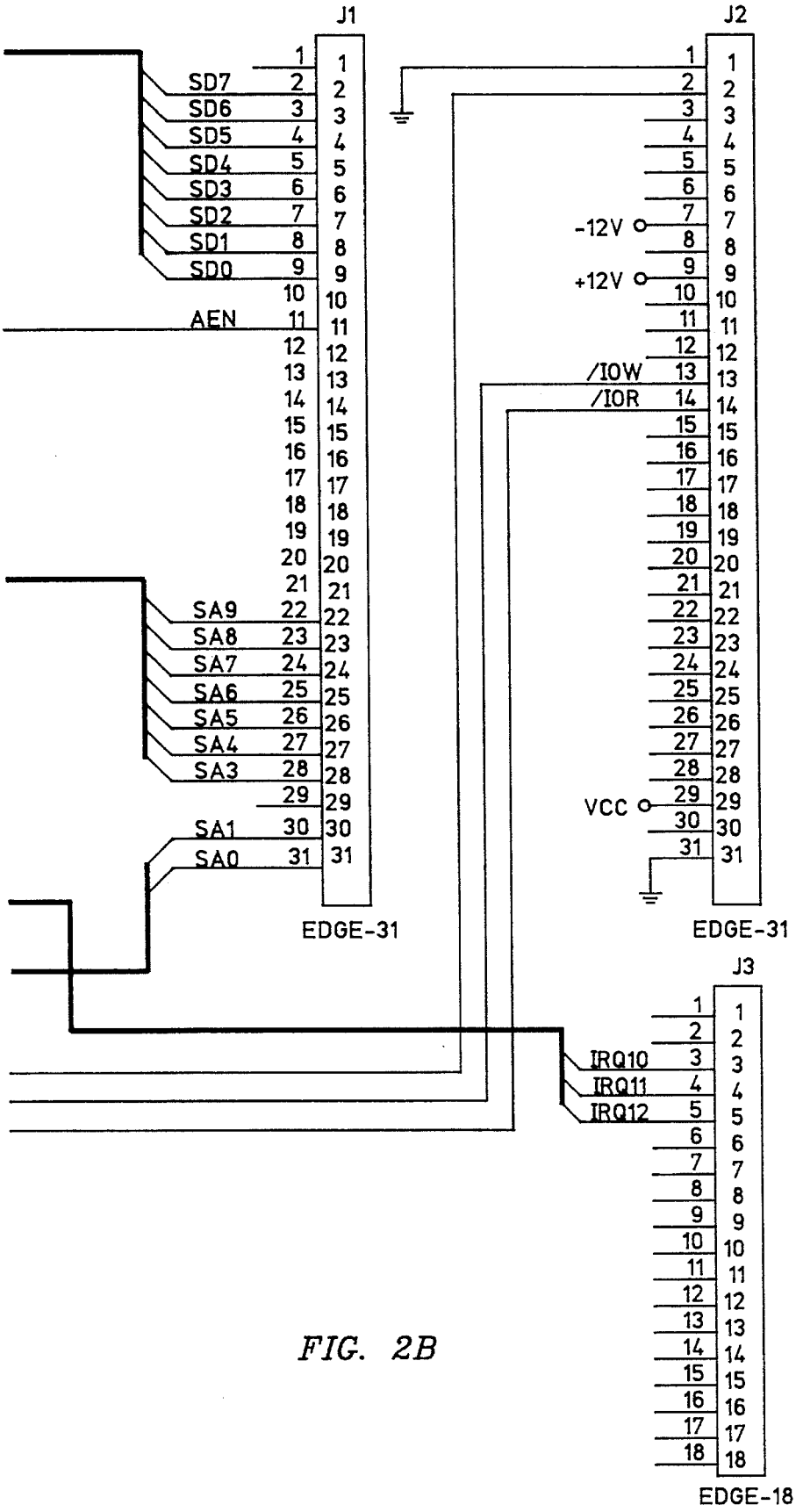

FIGS. 2A and 2B show the signals passing between controller interface 100 and the AT bus (i.e., I/O control data bus 12) of computer 10. Specifically, signals pass from the AT bus through edge connectors (J1, J2 and J3) of computer 10. Also shown is matched transmit clock 134 consisting of a 4.0 Mhz oscillator (U8) and a divide-by-four circuit (U9) used to obtain a 500 kHz clock (i.e., clock signal 135) that shifts data out of (transmit) FIFO memories 132*a*, 132*b*, . . . The choice of a 500 kHz clock was arrived at based on simplicity of design and empirical studies. However, it is to be understood that other clock signals may be used that approximate the speed of the receive clock signal output by the DAMA devices. Since controller interface 100 operates in the personal computer's I/O address space, nine address bits (SA0–SA1, SA3–SA9) are used. SA0–SA1 select the desired board function: DATA I/O, CHANNEL SELECT, CONTROL and STATUS, and START TRANSMIT CLOCK. When SA3–SA9 (at U7) match the board address determined by on board switch SW1, controller interface 100 is operational by the signal present on/BD SEL. When DATA I/O is selected, the previously selected controller interface channel will either have data loaded into the associated (transmit) FIFO memory or data read from its associated (receive) FIFO memory. When CHANNEL SELECT is selected, one of the four controller interface channels communicating with a particular one of the DAMA devices will be selected to perform a subsequent read or write operation. When CONTROL and STATUS is selected, either the control word may be written or the status word may be read. When START TRANSMIT CLOCK is selected, the 500 kbs transmit clock from matched transmit clock 134 is gated with each of the channel enables until all data has been sent from transmit FIFO memories 132*a*, 132*b*, . . . that are enabled.

Figure 3A:
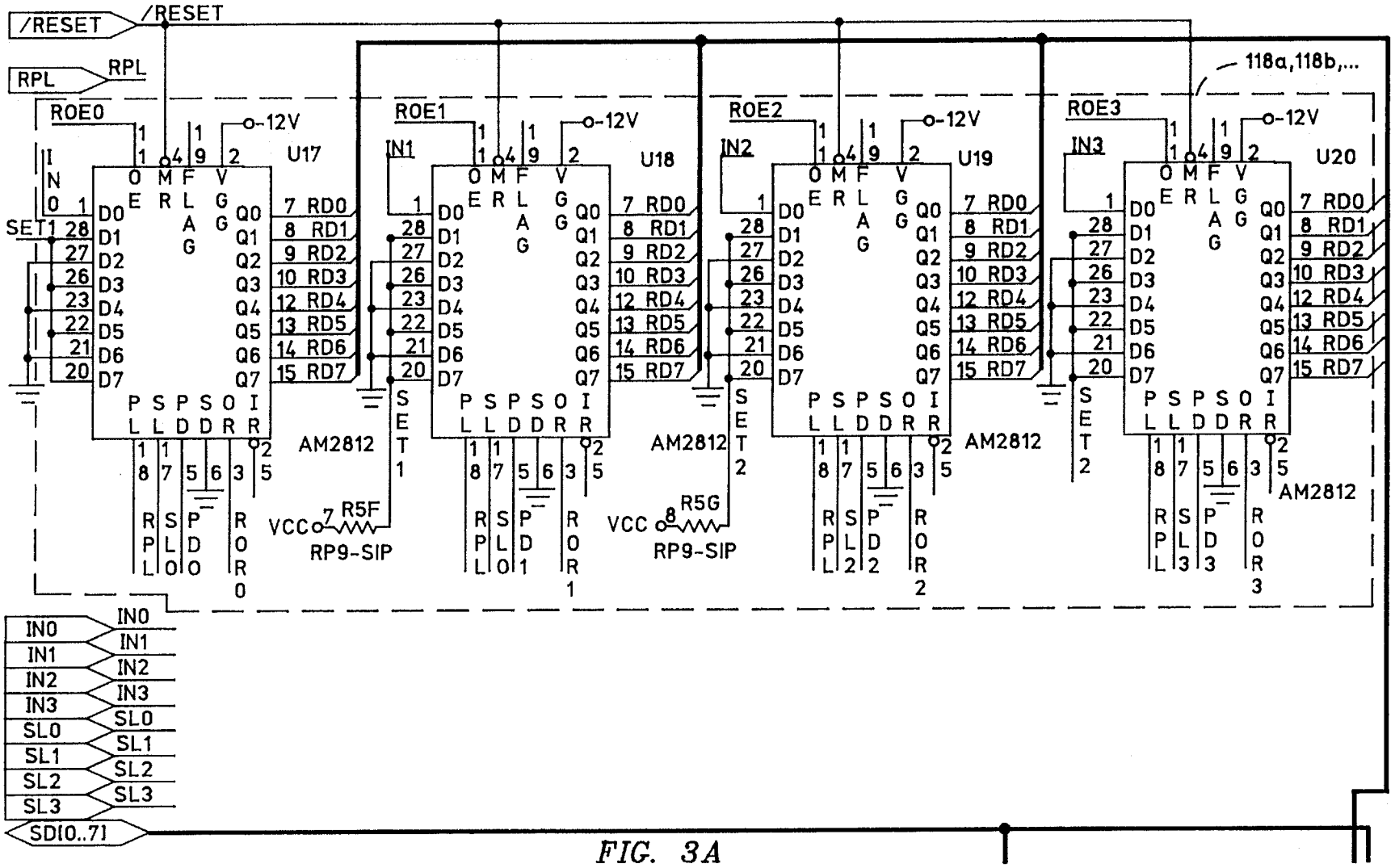
FIGS. 3A and 3B are the diagram of four receive FIFO memory devices, the receive data buffer, the status byte buffer and part of the sequencing and logic circuits for the FIFO command and control.
Figure 3B:
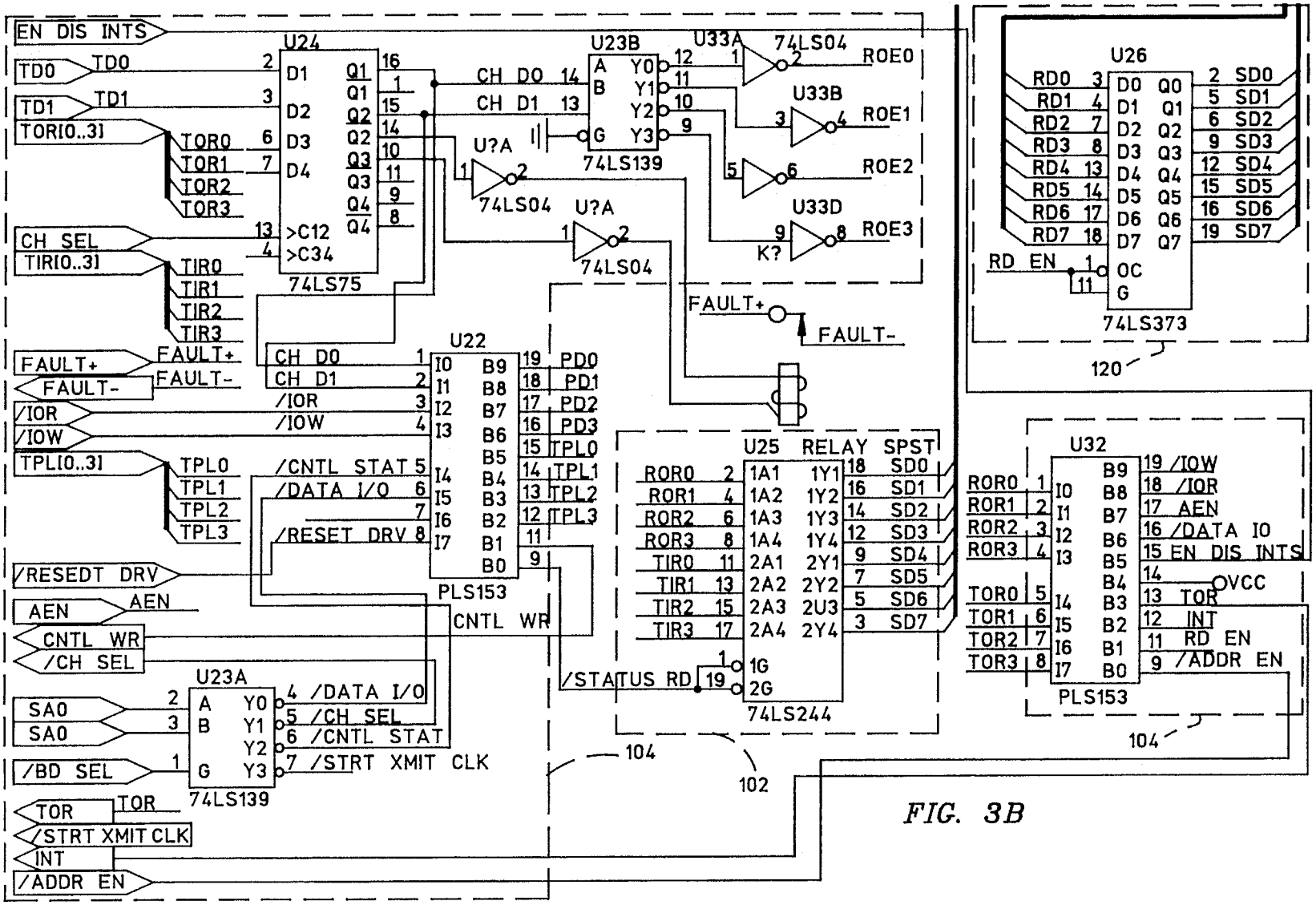

FIGS. 3A and 3B illustrate the detailed diagram for four receive FIFO memories 118*a*, 118*b*, . . . , receive data buffer or first buffer 120 and status byte buffer or third buffer 102. Also shown is a first portion of the sequencing and logic circuits associated with FIFO command and control 104.

Figure 4A:
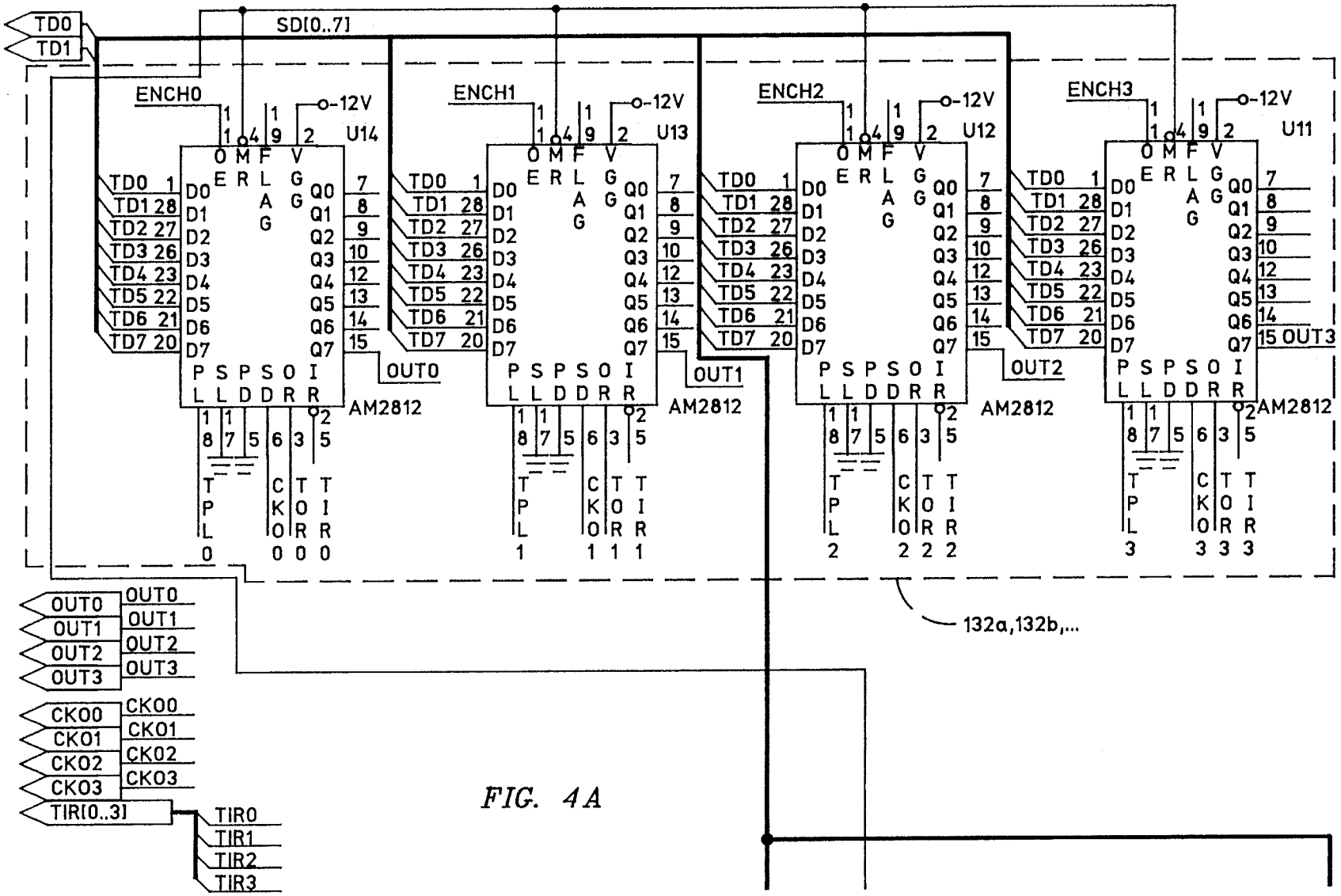
FIGS 4A and 4B are the diagram of four transmit FIFO memory devices, the transmit data buffer and the remainder of the sequencing and logic circuits for the FIFO command and control.
Figure 4B:
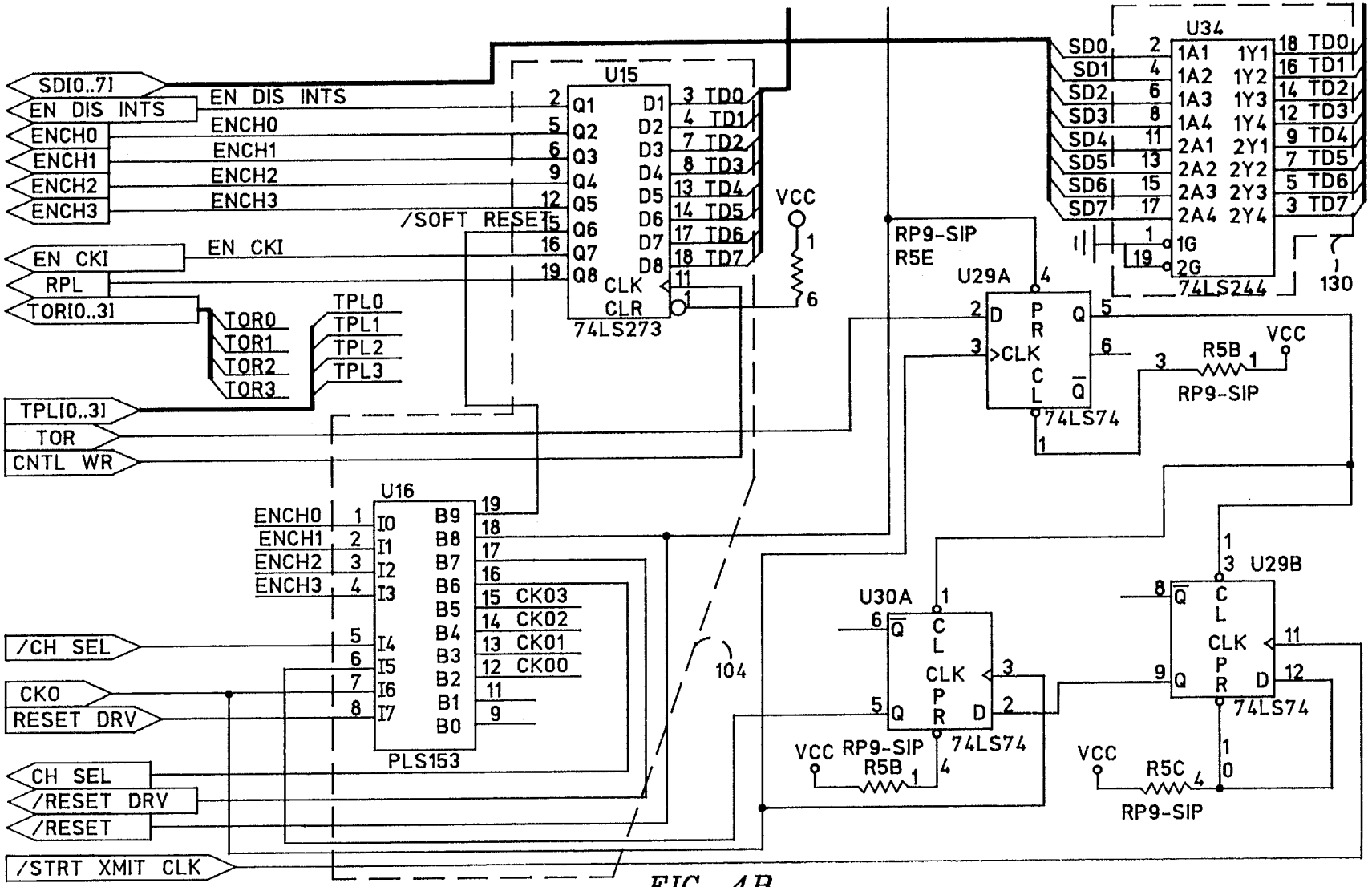

FIGS. 4A and 4B illustrate the detailed diagram for four transmit FIFO memories 132*a*, 132*b*, . . . , transmit data buffer or second buffer 130 and the remainder of the sequencing and logic circuits associated with FIFO command and control 104. Also shown are flip-flops (U29A, U29B, and U30A) used to start and stop matched transmit clock 134.

Figure 5A:
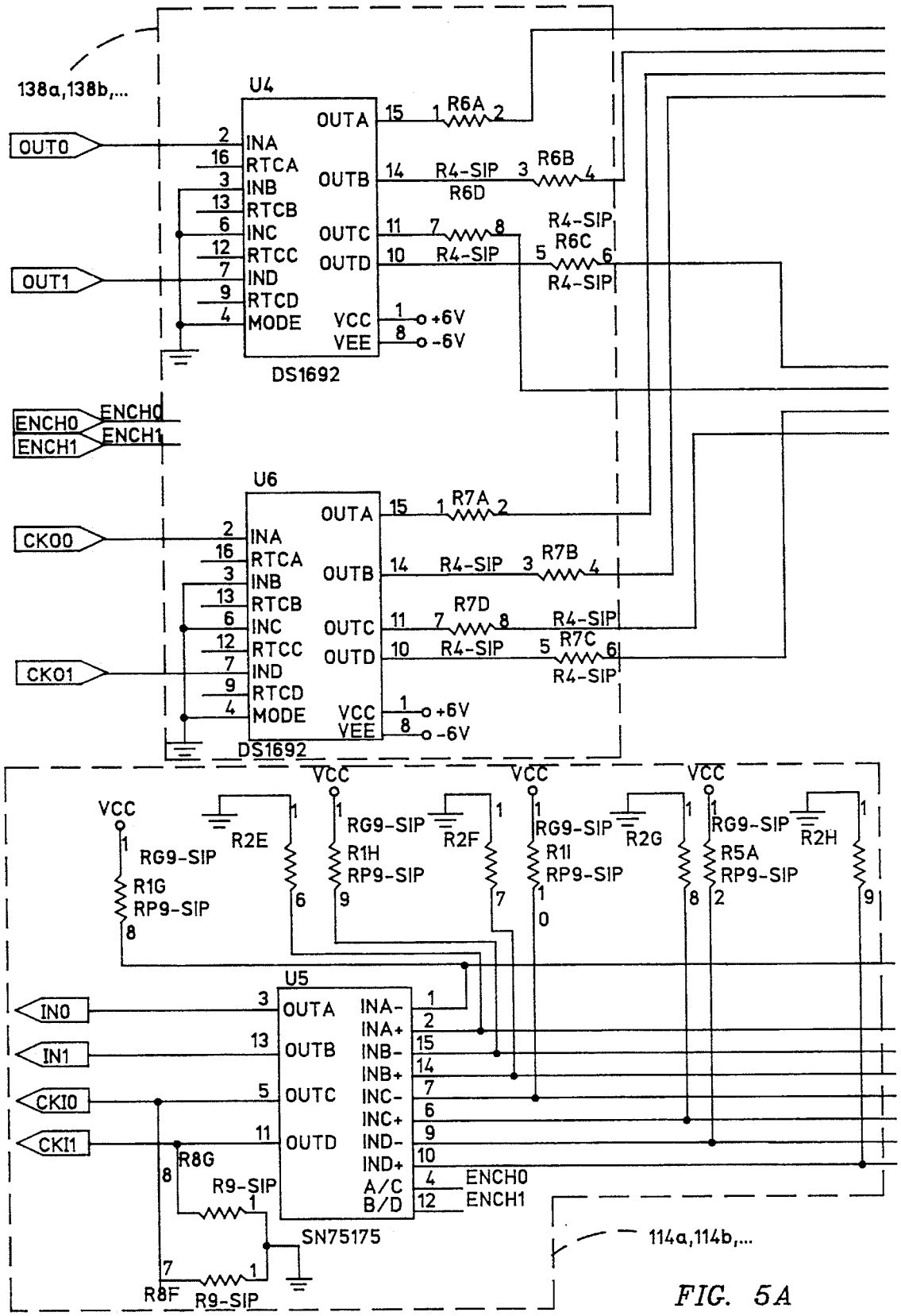
FIGS. 5A and 5B are the diagram for a portion of the differential line receiver and driver circuitry.
Figure 5B:
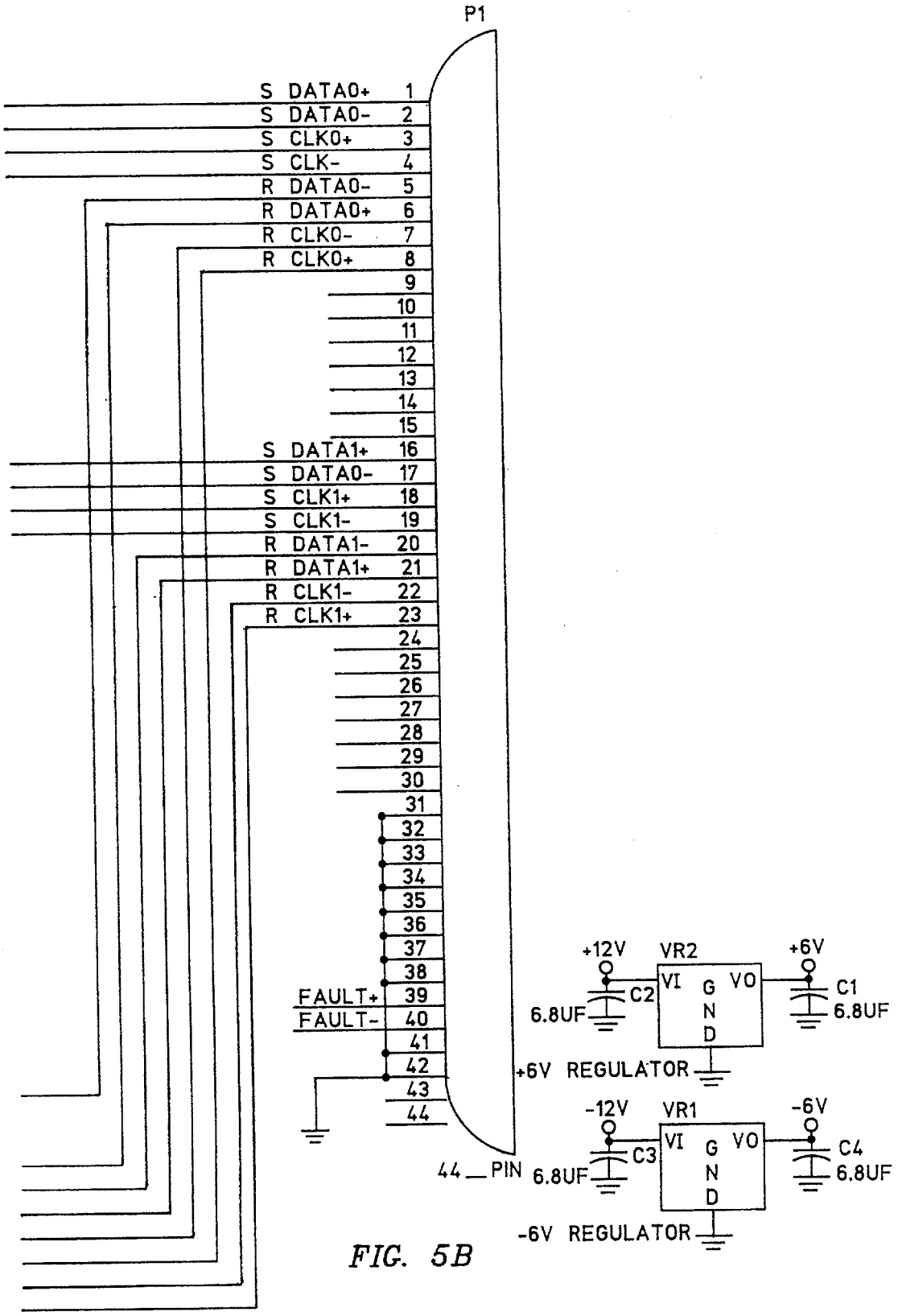
Figure 6A:
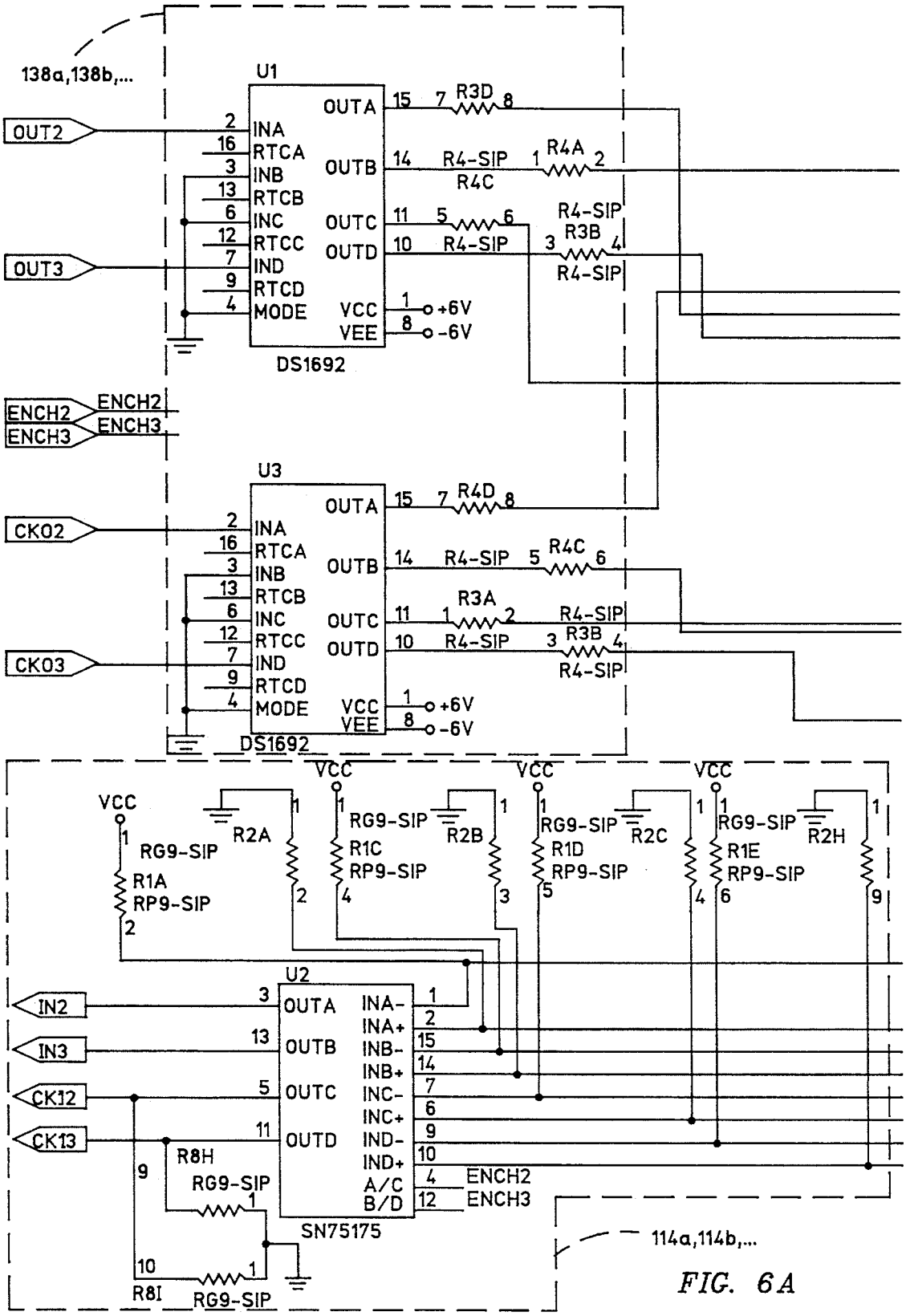
FIGS. 6A and 6B are the diagram for the remainder of the differential line receiver and driver circuitry.
Figure 6B:
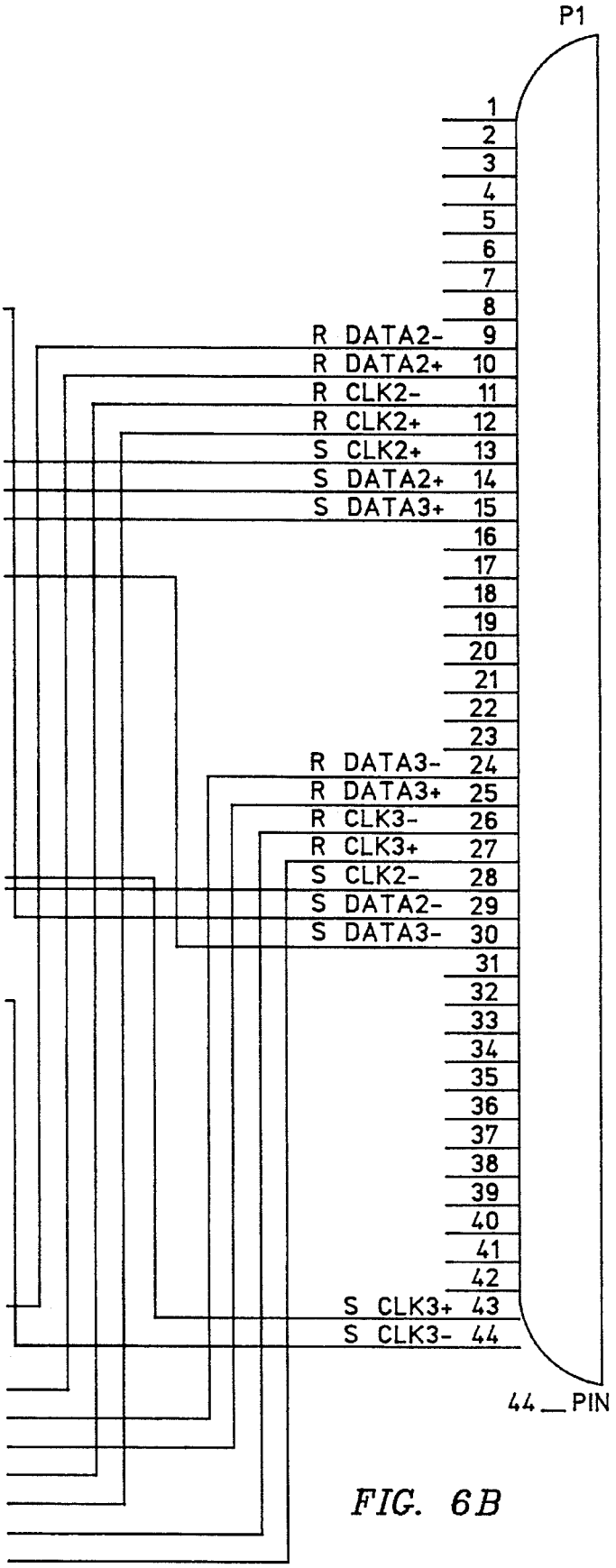
Figure 7:
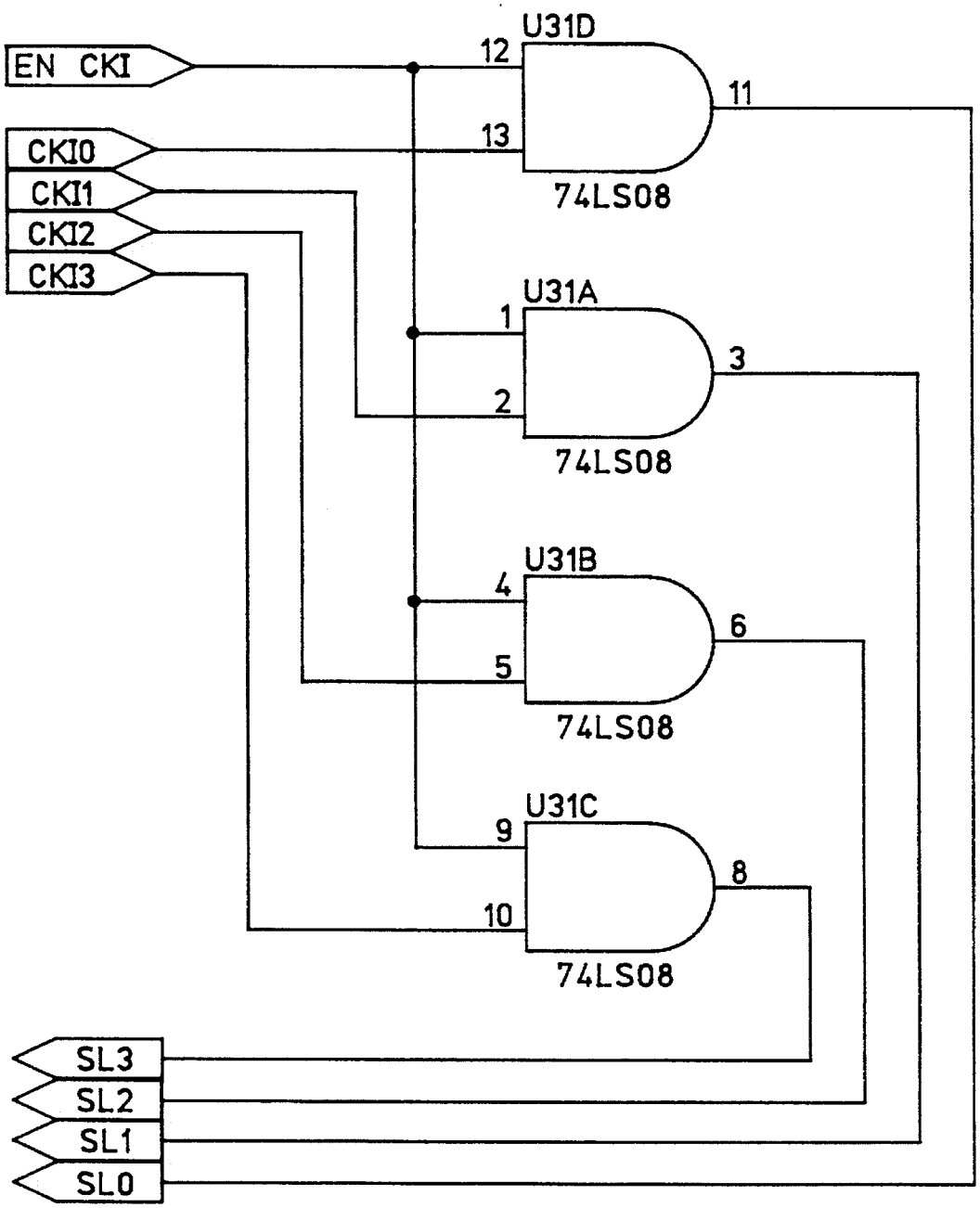

FIGS. 5A, 5B, 6A, and 6B illustrate the detailed diagrams for four differential line receivers 114*a*, 114*b*, . . . and for four differential line drivers 138*a*, 138*b*, . . . In terms of the differential line receivers, U5 and U2 are each configured to service two data lines and two clock lines, all of which are received from the DAMA devices. In terms of the differential line drivers, U4 and U1 each provide two data line drivers while U6 and U3 each provide two clock line drivers. Also shown on FIGS. 5A and 5B are voltage regulators (VR1 and VR2) which provide power for the drivers. Finally, a 44 pin, D-type connector on each DAMA device is shown with the external signals transmitted to each DAMA device and received by controller interface 100 from each DAMA device. FIG. 7 illustrates the detailed diagram of the gating of the clock signal at the receive side of controller interface 100 used to serially load receive FIFO memories 118*a*, 118*b*, . . .

The advantages of the present invention are numerous. The controller interface permits automatic control of a plurality of DAMA devices having a high-speed serial control port. Further, control of the DAMA devices can be transferred to a central point (i.e., a personal computer) where communications parameters can be set and the system can be left to operate without requiring monitoring and/or intervention. The present invention also provides the means to track UHF channel usage for maintaining privacy where necessary and for preventing constant key problems since the DAMA devices are centrally and not locally controlled. The present invention will find immediate utility as a controller interface of 1271 DAMA device that are hard wired thereto. The controller interface of the present invention can also be used as a central point of control to route DAMA controls from an on shore location to remote ship board DAMAs via satellite. In addition, the present invention will be easily adapted to the specific hardware requirements of alternate devices such as the ANUSQ42 ("MINI DAMA") which operates on the same send/receive cycle as the 1271 DAMA.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A controller interface for a demand assigned multiple access (DAMA) device comprising:

a matched pair of first-in, first-out (FIFO) memory devices, said matched pair consisting of a receive FIFO and a transmit FIFO, said receive FIFO being controlled by a clock signal output by said DAMA device, wherein serial format data is input into said receive FIFO which outputs parallel format data onto a first internal parallel data bus internal to said controller interface, and wherein parallel format data from a second parallel data bus internal to said controller interface is input into said transmit FIFO which outputs serial format data;

first buffer means for receiving parallel format data from said first internal parallel data bus and for outputting same onto an external parallel control data bus external to said controller interface;

second buffer means for receiving parallel format data from said external parallel control data bus and for outputting same onto said second internal parallel data bus;

third buffer means for storing status information from said receive FIFO indicative of the presence or absence of data stored within said receive FIFO, and for storing status information from said transmit FIFO indicative of said transmit FIFO's readiness to accept data;

control means for issuing an enable signal based on said status information to enable said receive and transmit FIFOs wherein said receive FIFO outputs parallel data onto said first internal parallel data bus when enabled, and wherein said transmit FIFO outputs serial format data when enabled; and clocking means for clocking data through said transmit FIFO, said clocking means generating clock pulses at a rate that is approximately equivalent to that of said clock signal used to control said receive FIFO.

2. A controller interface as in claim 1 wherein parallel and serial format data passing through said receive and transmit FIFOs is transistor-transistor-logic (TTL) level data, further comprising:

first format conversion means for receiving balanced voltage digital format data from said DAMA device and for converting same to serial format data at said TTL level for input to said receive FIFO; and second format conversion means for receiving serial format data at said TTL level from said transmit FIFO and for converting same to balanced voltage digital format data to be output from said controller interface.

3. A controller interface as in claim 2 wherein said clocking means is connected to said second format conversion means to control clocking of data therethrough.

4. An apparatus for controlling a plurality of demand assigned multiple access (DAMA) devices comprising:

processing means for processing DAMA control data;

a control data bus for transmitting said DAMA control data to and from said processing means in parallel format;

a plurality of matched pairs of first-in, first-out (FIFO) memory devices, one matched pair corresponding to each DAMA device with each DAMA device having an operative clock rate, each matched pair consisting of a receive FIFO and a transmit FIFO, said receive FIFO being controlled at said operative clock rate of said corresponding DAMA device, wherein serial format data is input into said receive FIFOs which output parallel format data onto a first parallel data bus, and wherein parallel format data from a second parallel data bus is input into said transmit FIFOs which output serial format data;

first buffer means for receiving parallel format data on said first parallel data bus and for outputting same onto said control data bus;

second buffer means for receiving parallel format data on said control data bus and outputting same onto said second parallel data bus;

third buffer means for storing status information from each of said receive FIFOs indicative of the presence or absence of data stored within said receive FIFOs, and for storing status information from each of said transmit FIFOs indicative of said transmit FIFOs' readiness to accept data;

control means for issuing an enable signal based on said status information to enable a selected one of said receive and transmit FIFOs wherein said selected receive FIFO outputs parallel data onto said first parallel data bus, and wherein said selected transmit FIFO outputs serial format data; and clocking means for clocking data through said selected transmit FIFOs, said clocking means generating clock pulses at a rate that is approximately equivalent to said corresponding DAMA devices' operative clock rate.

5. An apparatus as in claim 4 wherein said processing means is a PC/AT type processor, said DAMA devices are TD-1271B/U DAMA devices, and parallel and serial format data passing through said receive and transmit FIFOs is transistor-transistor-logic (TTL) level data, further comprising:

first format conversion means for receiving balanced voltage digital format data from said TD-1271B/U DAMA devices and for converting same to said serial format data at said TTL level for input to said receive FIFOs; and second format conversion means for receiving serial format data at said TTL level from said transmit FIFOs and for converting same to said balanced voltage digital format data for output to said TD-1271B/U DAMA devices.

6. An apparatus as in claim 4 wherein said DAMA devices are TD-1271B/U DAMA devices and said receive and transmit FIFOs comprise 32 byte FIFO memory devices.

7. An apparatus as in claim 4 wherein said DAMA devices are TD-1271B/U DAMA devices and a clock rate of said clocking means is approximately equal to 480 kilo bits per second.

8. An apparatus as in claim 4 wherein each of said receive and transmit FIFOs has an enable input for receiving said enable signal and wherein parallel outputs of said receive FIFOs and serial outputs of said transmit FIFOs occupy a high impedance state until receiving said enable signal.

* * * * *